US010433218B1

(12) United States Patent
Damenti

(10) Patent No.: US 10,433,218 B1
(45) Date of Patent: *Oct. 1, 2019

(54) EFFICIENT USE OF A COMMUNICATIONS NETWORK

(71) Applicant: CSC Holdings, LLC, Bethpage, NY (US)

(72) Inventor: Nicholas Damenti, Setauket, NY (US)

(73) Assignee: CSC Holdings, LLC, Bethpage, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/039,693

(22) Filed: Jul. 19, 2018

Related U.S. Application Data

(63) Continuation of application No. 15/212,608, filed on Jul. 18, 2016, now Pat. No. 10,070,352, which is a continuation of application No. 14/330,574, filed on Jul. 14, 2014, now Pat. No. 9,420,505, which is a continuation of application No. 13/079,556, filed on Apr. 4, 2011, now Pat. No. 8,780,859.

(60) Provisional application No. 61/364,695, filed on Jul. 15, 2010.

(51) Int. Cl.
*H04W 4/00* (2018.01)
*H04W 36/00* (2009.01)
*H04M 15/00* (2006.01)
*H04W 4/24* (2018.01)
*H04W 36/14* (2009.01)

(52) U.S. Cl.
CPC ....... *H04W 36/0072* (2013.01); *H04M 15/31* (2013.01); *H04M 15/8038* (2013.01); *H04M 15/60* (2013.01); *H04W 4/24* (2013.01); *H04W 36/14* (2013.01)

(58) Field of Classification Search
CPC ... H04W 36/0072; H04W 4/24; H04W 36/14; H04M 15/31; H04M 15/8038; H04M 15/60
USPC .......................................................... 370/331
See application file for complete search history.

(56) References Cited

U.S. PATENT DOCUMENTS

| 6,246,870 | B1 | 6/2001 | Dent et al. |
| 7,768,939 | B1 | 8/2010 | Trivedi et al. |
| 7,965,637 | B1 | 6/2011 | Trivedi et al. |
| 8,611,333 | B2 | 12/2013 | Ji et al. |
| 8,635,499 | B2 | 1/2014 | Cohn et al. |
| 8,660,571 | B2 | 2/2014 | Hulkkonen et al. |
| 8,780,859 | B2 * | 7/2014 | Damenti ................. H04L 12/14 370/331 |
| 9,032,083 | B2 | 5/2015 | Scherer et al. |
| 9,036,582 | B2 | 5/2015 | Scherer et al. |
| 9,420,505 | B1 * | 8/2016 | Damenti ................. H04L 12/14 |
| 9,491,690 | B2 | 11/2016 | Damenti et al. |

(Continued)

FOREIGN PATENT DOCUMENTS

WO  WO 2011/023231 A1  3/2011

*Primary Examiner* — Chuong T Ho
(74) *Attorney, Agent, or Firm* — Sterne, Kessler, Goldstein & Fox P.L.L.C.

(57) ABSTRACT

A duration of time a communications device is connected to a first network is monitored. A signal of a second network is detected. Next, it is determined whether a predetermined amount of time has elapsed such that the communications device makes efficient use of the first network, and in response to a determination that the predetermined amount of time has elapsed, a connection of the communications device to the second network is initiated.

20 Claims, 5 Drawing Sheets

(56) References Cited

U.S. PATENT DOCUMENTS

| | | |
|---|---|---|
| 9,661,563 B1 | 5/2017 | Damenti et al. |
| 9,794,869 B1 | 10/2017 | Damenti et al. |
| 9,980,212 B1 | 5/2018 | Damenti et al. |
| 2003/0083061 A1 | 5/2003 | Robinson et al. |
| 2005/0191987 A1 | 9/2005 | Zhao et al. |
| 2006/0166699 A1 | 7/2006 | Aghvami et al. |
| 2006/0269028 A1 | 11/2006 | Bley et al. |
| 2006/0281436 A1 | 12/2006 | Kim et al. |
| 2007/0082671 A1 | 4/2007 | Feng et al. |
| 2008/0014941 A1 | 1/2008 | Catovic et al. |
| 2008/0016525 A1 | 1/2008 | Cai et al. |
| 2008/0181180 A1* | 7/2008 | Karaoguz ............ H04B 7/0408 370/331 |
| 2009/0197604 A1 | 8/2009 | Gupta et al. |
| 2009/0310560 A1 | 12/2009 | Gandham et al. |
| 2010/0020769 A1 | 1/2010 | Ma et al. |
| 2010/0081428 A1 | 4/2010 | Maejima et al. |
| 2010/0167741 A1 | 7/2010 | Lee |
| 2010/0234021 A1 | 9/2010 | Ngai et al. |
| 2010/0304794 A1 | 12/2010 | Beninghaus et al. |
| 2011/0211511 A1 | 9/2011 | Bakthavathsalu et al. |
| 2012/0014271 A1* | 1/2012 | Damenti ................ H04L 12/14 370/252 |
| 2012/0020325 A1 | 1/2012 | Swamy et al. |
| 2012/0058770 A1 | 3/2012 | Lee |
| 2012/0184276 A1 | 7/2012 | Pichna et al. |

\* cited by examiner

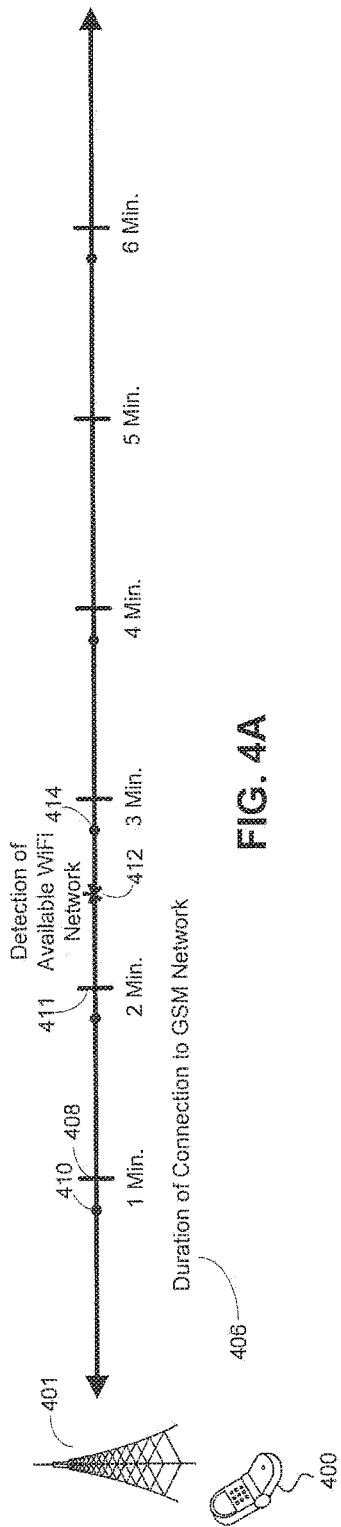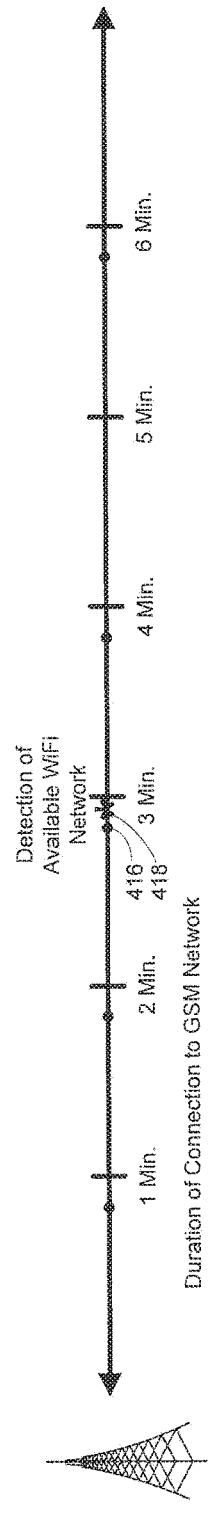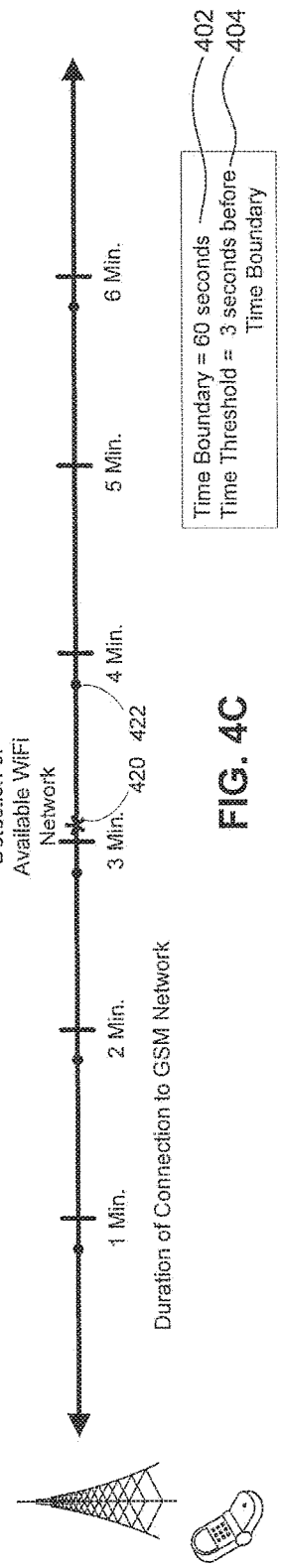
FIG. 4A
FIG. 4B
FIG. 4C

EFFICIENT USE OF A COMMUNICATIONS NETWORK

CROSS-REFERENCE TO RELATED APPLICATIONS

This application is a continuation of U.S. patent application Ser. No. 15/212,608, filed Jul. 18, 2016, now U.S. Pat. No. 10,070,352, which is a continuation of U.S. patent application Ser. No. 14/330,574, filed Jul. 14, 2014, now U.S. Pat. No. 9,420,505, which is a continuation of U.S. patent application Ser. No. 13/079,556, filed Apr. 4, 2011, now U.S. Pat. No. 8,780,859, which claims the benefit of U.S. Provisional Application No. 61/364,695, filed on Jul. 15, 2010, all of which is incorporated herein by reference in its entirety.

FIELD OF THE INVENTION

This application relates generally to telecommunications and more specifically to telecommunications handovers.

BACKGROUND

Currently, mobile handsets have the ability to communicate using one or more mobile network technologies, such as: Global System for Mobile Communications (GSM); Code division multiple access (CDMA); Integrated Digital Enhanced Network (iDEN) or Long Term Evolution (LTE). Mobile network operators have infrastructure in place around the world supporting one or more of the aforementioned mobile network technologies, forming worldwide mobile communications networks. Each of these network operators acquires one or more radio spectrum licenses from government agencies setting forth discrete frequency ranges in which it is permitted to operate.

When a mobile handset subscriber ventures outside of his or her network operator's coverage area, or if the subscriber's network coverage is interrupted for any reason, the mobile handset may then switch to a roaming status so that it can utilize the infrastructure of another mobile network operator. If the subscriber's network operator has an agreement with another network operator that has network coverage for the area covering the roaming mobile handset, the mobile handset may then initiate a handover to the visited communications network. The mobile handset usage by the subscriber is monitored and billed to the subscriber, usually at a higher rate than would usually be charged by the subscriber's normal network operator.

Sometimes a handover occurs between a cellular network and a non-cellular network, such as, for example, a WiFi network (based on the IEEE 802.11 standard). Thus, a user talking on a mobile handset that is both WiFi and mobile network capable may have a call handed over between the WiFi and mobile networks.

Many service providers charge by the minute, which can result in an undesirable charge if the communication is brief or if the subscriber's network coverage is only temporarily interrupted. Thus, it is advantageous to minimize the amount of time that a subscriber spends using a network that is not operated by his or her network operator. This is especially true in the case of a handover from a WiFi network to a mobile network.

Today, the logic that governs the handover from a mobile network to WiFi is triggered by WiFi signal strength and/or network connection quality. In most cases, this logic alone is sufficient to manage handovers from a mobile network to WiFi. In some cases a subscriber may frequently drift in and out of WiFi coverage. Each time a subscriber drifts out of WiFi, a handover to a mobile network is triggered. Frequent handovers between WiFi and a mobile network can result in extra mobile network usage costs because, for example, a mobile network voice usage is rounded up to the nearest minute.

For instance, a mobile phone user may be connected to a mobile network for 15 seconds and then detect (and switch to) a WiFi network. After 20 seconds connected to WiFi, the WiFi connection may start dropping packets, and the mobile phone user may switch to the mobile network for a more stable connection to complete the telephone call. After another 20 seconds, the telephone call may be terminated. In this example, the telephone call was connected via the mobile network for a total of 35 seconds, but because the mobile phone connected via the mobile network for two separate segments of 15 seconds and 20 seconds each, the mobile phone user will be charged for 2 minutes of mobile network time. If the call had remained connected to the mobile network continuously, without switching to WiFi, a total of 55 mobile network seconds would have been used, but because the mobile phone user would have been connected to the mobile network for a single segment, the mobile phone user would only be charged for 1 minute of mobile network time.

What is needed therefore are systems, methods, apparatuses, and computer program products to enable handover logic that is cost efficient. The logic should enable handover from a first network to a second network, such that the handover logic makes the most economical use of the first network before the handover is initiated.

SUMMARY

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

In an embodiment, a duration of time a communications device is connected to a first network is monitored. A signal of a second network is detected. Next, it is determined whether a predetermined amount of time has elapsed such that the communications device makes efficient use of the first network, and in response to a determination that the predetermined amount of time has elapsed, a connection of the communications device to the second network is initiated.

Further features and advantages of the invention, as well as the structure and operation of various embodiments of the present invention, are described in detail below with reference to the accompanying drawings. The invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIGS. 4A-4C illustrate examples of handover logic according to one embodiment.

Figure 1:
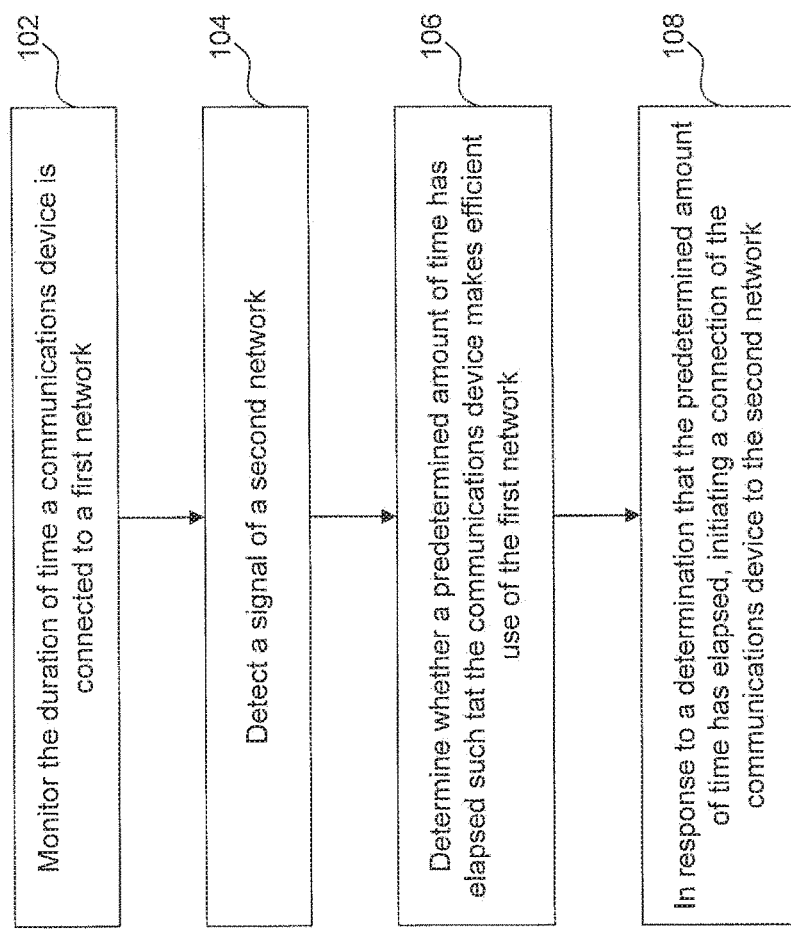
FIG. 1 is a flowchart of a method 100 according to an exemplary embodiment.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

Systems, methods, apparatuses, and computer program products are provided to enable handover logic from a first network to a second network, such that the handover logic makes the most economical use of the first communications network before initiating the handover. It should be noted that while systems comprising two networks are described below, embodiments comprising any number of networks may be implemented. Embodiments may be applicable to any case where there is a differential in cost between networks and wherein network service providers charge using billing increments.

1. OVERVIEW

Typical wireless communications networks have coverage areas with a limited range. Thus, a subscriber of a wireless communications network may drift out of the range of the network his or her service provider operates, or the subscriber may experience connectivity issues with the network. In either instance, a subscriber may then connect to a visited network if the service provider has an agreement with the visited network allowing for roaming access to the network by the service provider's subscribers.

Once the subscriber connects to the visited network, the subscriber's usage of the visited network will be monitored and charged to the subscriber. However, usage of the visited network is often much more expensive than usage of the subscriber's service provider network, and so it is desirable to minimize usage of the visited network as much as possible and to do so in a cost effective way.

Embodiments of the present invention solve these problems by providing systems, methods, apparatuses, and computer program products for efficient use of a communications network. In an embodiment, a system according to the present invention determines whether the duration of time a communications device is connected to a visited network is sufficient to optimize efficient use by the communications device of the visited network.

For example, many service providers charge by the minute. Therefore, if a communications device is currently connected to a visited, non service provider network and has the option of remaining connected to the visited network or connecting to the service provider network, it is desirable to remain connected to the visited network until a sufficient portion of the minute to be charged has elapsed such that cost-effectiveness is maximized. Ideally, it would be most cost-effective for the full sixty seconds to be utilized by the communications device before connecting to the service provider network. However, to avoid inadvertently using time from the next minute before a handover has completed, it may be desirable to initiate a handover a short period (for example, a few seconds) before the full minute has been used by the communications device.

In an embodiment, the subscriber is a customer of a WiFi service provider and accesses a communications network through a WiFi access point using a mobile handset. The subscriber may access the WiFi network through any WiFi network access point operated by the service provider or by a subscriber of the service provider. If there is no available WiFi network access point for the mobile handset, the mobile handset may then attempt to initiate a handover to a visited network (such as a GSM network) operated by a third party with whom the service provider has a roaming agreement. However, because usage of the visited network is more expensive than usage of the service provider network, the mobile handset may continually search for an available WiFi network.

FIG. 1 illustrates a method 100 according to an exemplary embodiment. While a communications device (e.g., a mobile handset) is connected to a visited network (e.g., a GSM network), the visited network and/or the communications device may monitor 100 a duration of time the communications device is connected to the visited network. When the communications device detects 104 an available service provider network (e.g, a WiFi network in the case of a WiFi service provider), a determination 106 is made (e.g., by the mobile handset or the service provider) regarding whether a predetermined amount of time has elapsed such that the communications device has made efficient use of the visited network. In other words, a determination is made regarding whether an effective portion of the visited network's billing increment has been utilized such that enough time remains in the current billing increment of the visited network to (1) establish a connection to a new (e.g., service provider) network; and (2) disconnect the connection to the visited network at or before the completion of its current billing increment.

For example, if the visited network charges by the minute, it may be determined that it is most cost effective to switch to the service provider network at a predetermined time window or time threshold (e.g., a few seconds before the current minute being charged has elapsed) so that excess time is not wasted. In an embodiment, the time window (or time threshold) is configurable. For example, the time window (or time threshold) may be configured by a user or by a network service provider. Once the time window or time threshold has been reached, a handover to the service provider network may then be initiated 108. In one embodiment, the handover is initiated by the communications device. In another embodiment, the handover is initiated by the service provider once the service provider receives a message from the communications device. Once the handover is initiated, the communications device is disconnected from the visited network.

It should be understood that embodiments comprising any number of networks may be possible. Further, each network may be configured to use the same communication standard or a different communication standard. For example, in an embodiment both the service provider network and the visited network may be GSM networks. In another embodiment, both the service provider network and the visited network may be WiFi networks. Additionally, for example, in some embodiments three or more networks may be available, and a determination may be made to switch to the most cost effective network.

2. NETWORK STRUCTURE

Figure 2:
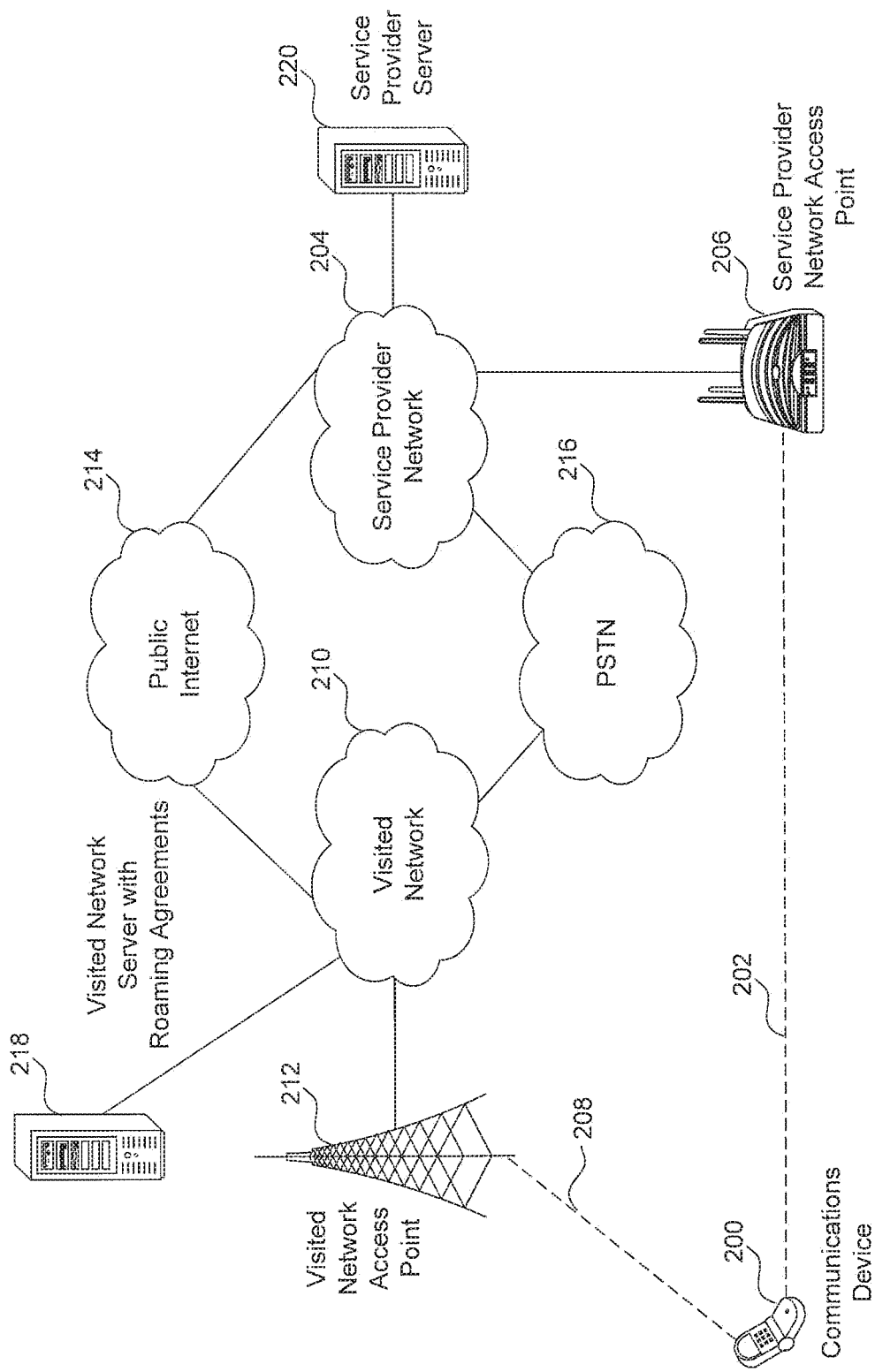
FIG. 2 illustrates network structure and communications according to an exemplary embodiment.

Network structure and communications according to an exemplary embodiment will now be described with reference to FIG. 2. A communications device 200 may connect 202 to a service provider network 204 through a service provider network access point 206 or connect 208 to a visited network 210 through a visited network access point 212. As an example, a user of communications device 200 is a subscriber of a WiFi service. Thus, service provider network 204 is a WiFi network, and access point 206 is a WiFi access point, such as a wireless router. If no WiFi access point 206 of sufficient signal strength and/or network connection quality is available, the communications device 200 may connect to visited network 210 through a visited network access point 212. As an example, visited network 210 is a GSM network, and the visited network access point 212 is a cell tower. GSM network 210 communicates with WiFi service provider network 204 by sending information over the public internet 214, and the WiFi service provider network 204 communicates with the visited GSM network 210 by sending information over the Public Switched Telephone Network (PSTN) 216.

3. ROAMING

Roaming according to an exemplary embodiment will now be described with reference to FIG. 2. When communications device 200 is connected 208 to visited network 210, visited network 210 may then recognize the communications device 200 and note that it is not registered within the visited network 210. The visited network 210 may then determine if there is a roaming agreement between the service provider network 204 and the visited network 210 (for example, by checking a list of roaming agreements in a server 218 accessible by the visited network 210 and may deny access of the communications device 200 to the visited network 210 if there is no roaming agreement.

Upon determination that a roaming agreement exists, the visited network 210 and/or the communications device 200 may maintain a record of information regarding the communication device's use of the visited network 210, including a duration of time that the communications device 210 is connected to the visited network 210.

If the communications device 200 is connected to the visited network 210, and the subscriber uses the communications device 200 to send or receive data (e.g., sending or receiving a mobile handset call), the communications device 200 will send this information to the visited network 210. The visited network 210 may then contact the service provider through a network accessible by the service provider (e.g., the internet 214 in the case of a WiFi service provider) and send a message, with the digits of the number to be called or the number calling the communications device, informing the service provider that a call is being made or received. The service provider then returns a roaming number (generated, for example, by a server 220 accessible by the service provider) to the visited network 210 by sending a message through the PSTN 216 to the visited network 210. The visited network 210 then launches the call.

4. COMMUNICATIONS DEVICE REGISTRATION

Figure 3:
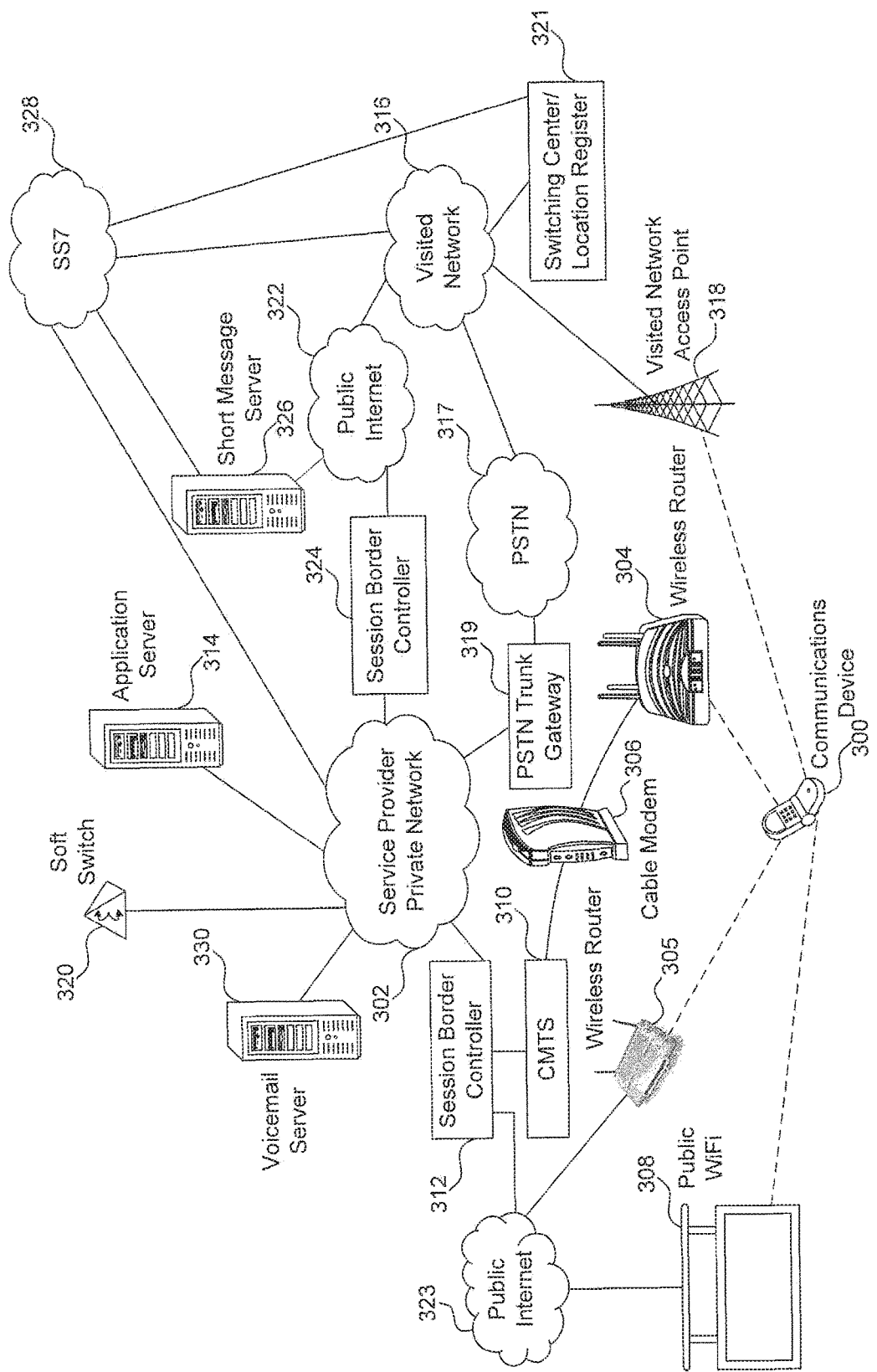
FIG. 3 illustrates another exemplary embodiment of network structure and communications.

Communications device registration according to an exemplary embodiment will now be described with reference to FIG. 3. In the case of a communications device 300 registering with a network 302 of a WiFi service provider, the communications device (for example, a mobile handset) 300 sends a signal to the service provider through a WiFi access point. WiFi access points may include, for example, a wireless router 304 or 305, or public WiFi 308. In an embodiment, a WiFi access point 304 communicates via a Cable Modem 306 with a Cable Modem Termination System (CMTS) 310 at the service provider's head end, which connects to the service provider private network 302 through a session border controller 312. In another embodiment, a WiFi access point 305 communicates via the Public Internet 323, which in turn connects to the service provider private network 302 through the session border controller 312. The communications device 300 then registers with an application server 314 accessible by the service provider private network 302.

In the case of a communications 300 device registering with a visited GSM network 316, the communications device 300 sends a signal to a visited network access point (for example, a cell tower) 318 and communicates with a switch center and/or location register 321 accessible by the visited network 316. The location of the communications device 300 is updated, and the communications device is registered with the GSM network.

In some embodiments, the service provider network may also access a voicemail server 330 and/or a short message server 326 for sending SMS messages through a SS7 network 328. Likewise, in some embodiments, the visited network may connect to a short message server 326 through a SS7 network 328.

5. COMMUNICATIONS

Communication according to exemplary embodiments will now be described with reference to FIG. 3. In the case of a subscriber originated communication (e.g., mobile handset call) over a WiFi service provider network, the communications device 300 sends a signal through a WiFi access point (e.g., 304, 305, or 308) to the service provider private network 302 through either the CMTS 310 or Public Internet 323, as applicable and session border controller 312. The communication is then routed to an application server 314, and the outbound communication is routed to the PSTN 317 through a PSTN trunk gateway 319 using a soft switch 320. The PSTN 317 routes the outbound call to the recipient, who answers the call.

In the case of a WiFi service subscriber receiving a communication from a caller using a GSM network, the communication is routed from the PSTN 317 through a PSTN trunk gateway 319 to the private service provider network 302. The soft switch 320 routes the call to the application server 314, and the application server 314 returns an anchoring number to the communications device 300 by sending a signal to the communications device 300 through the session border controller 312, either the CMTS 310 or Public Internet 323, as applicable, and the WiFi access point (e.g., 304, 305, or 308) connecting the communications device 300 to the service provider private network 302.

In the case of a WiFi subscriber originating a call over a visited GSM network, the communications device 300 sends a signal to the visited network 316 through a visited network access point 318. A switching center 321 accessible by the visited network 316 sends a request for an anchoring number to the service provider application server 314. The request is sent over the public internet 322 to the service provider network 302 through a session border controller 324. The application server returns the anchoring number, through the public internet 322, to the switching center 321 accessible by the visited network 316. The switching center 321 then routes the call to the roaming number using the soft switch 320 of the service provider private network 302, and the soft switch 320 routes the roaming number to the application server 314. The application server 314 then routes the call to the originally dialed party, using the soft switch 320, by sending a signal to the PSTN 317 through the PSTN trunk gateway 319. The PSTN 317 routes the call to the recipient.

In the case of a WiFi subscriber currently connected to a visited GSM network and receiving a communication from another party, the communication is routed from the other party through the PSTN 317, through the PSTN trunk gateway 319, to the service provider private network 302. The soft switch 320 routes the call to the application server 314, and the application server 314 requests a roaming number from the switching center 321 accessible by the visited network 316 by sending a request through the public internet 322. The switching center 321 provides the requested roaming number to the application server 314. The application server 314 then routes the call to the roaming number, using the soft switch 320, by sending a signal through the PSTN trunk gateway 319 and the PSTN 317 to the visited network 316. The visited network 316 then sends a signal to the communications device 300 through the visited network access point 318.

6. HANDOVER

6.1. Overview

In telecommunications, a "handover" or "handoff" occurs when a communications device transfers a connection from an original network to a new network. For example, a handover may be done because the communications device has moved away from an area covered by the original network, because the capacity of the original network is used up, or because the connectivity of the communications device with respect to the original network is limited, and a network offering better connectivity is available. Ideally, a handset call or data session in progress is not interrupted during the handover process.

In an embodiment, if a subscriber comes into range of an access point of the service provider (e.g., a WiFi access point), the communications device will detect the access point (for example, using software installed on the communications device) and may then determine if the access point has sufficient signal strength (e.g., by determining whether signal strength is over a predetermined threshold) and/or acceptable network connection quality characteristics (i.e., acceptable latency, jitter and packet loss). A determination is then made (e.g., by the mobile handset or the service provider) regarding when it will be most cost effective to switch to the service provider network. If it is determined that a handover is to be made, the communications device will begin the process of registering to the network of the service provider and initiating a handover request.

If the subscriber is communicating with another party when the handover request is initiated, communications between the subscriber and the other party will not be interrupted by the handover process. For example, if a subscriber is currently on a mobile handset call with a party connected to a GSM network, the subscriber's mobile handset will send a message to the service provider informing the service provider that a call is in progress. In an embodiment, the service provider may then relocate the subscriber-facing leg of the call to the service provider network and disconnect the subscriber-facing leg of the call from the visited network. Ideally, the subscriber-facing leg of the call is disconnected from the visited network in a manner to avoid an audio gap and provide a contiguous transition that is undetectable by the subscriber.

Handovers will now be described in accordance with an embodiment with reference to FIG. 3. The communications device 300 dials a handover public service number over WiFi by sending a signal through the WiFi access point service the subscriber (e.g., 304, 305, or 308), either the CMTS 310 or public Internet 323, as applicable, and the session border controller 312, to the service provider private network 302. The application server 314 answers the public service call and reconnects the call legs and disconnects the GSM call leg.

6.2. Handover Logic

In an embodiment of the present invention, additional logic is incorporated into existing communications network handover logic to make the most economical use of a visited communications network. An embodiment of the present invention uses logic guided by the following factors: signal strength, network connection quality, a network usage timer, a time boundary, and a time window (or time threshold). However, it should be understood that these factors are exemplary and another set of factors is possible for evaluating whether a handover should be made.

In an embodiment, a communications device determines whether a signal from another network has sufficient signal strength and network connection quality before initiating a handover to the network. In another embodiment, the communications device determines whether a signal from another network has a sufficiently low packet loss rate before initiating a handover to the network.

In an embodiment, when communication (e.g., a handset call) originates on a visited network or is handed over to a visited network, a network usage timer begins. The network usage timer tracks the amount of time that the communications device connects to the visited network, and the network usage timer may be evaluated before initiating a handover to the service provider network to ensure that enough time has been spent while the communications device is connected to the visited network such that the visited network has been used in an economically efficient manner.

To make this evaluation, the network usage timer may be evaluated with respect to a time boundary and a time window (or time threshold). In an embodiment, a time boundary corresponds to a quanta of time that is used by a network operator for the purposes of charging a network user connected to the network. For example, if a network operator charges by the minute, a time boundary may occur each minute. A time window (or time threshold) may correspond to a period of time before the time boundary. In an embodiment, the time window (or time threshold) is configurable (for example, by a software client installed on the handset) and is set to maximize efficient use of the visited network before initiating a handover, without inadvertently crossing the time boundary before the completion of the handover occurs, including disconnecting from the visiting network. For example, in the case of a network operator that charges by the minute, the time window (or time threshold) may be set to a few seconds before each minute. If a service provider network becomes available, the communications device may wait until the time window (or time threshold) has been reached before initiating the handover to the service provider network.

In some embodiments, the network usage timer may be ignored if the network that the communications device is currently connected to has a weak signal or a high packet loss rate. For example, if a communications device connected to a GSM network detects a strong signal of a WiFi network, and the GSM signal is weak, the communications device may immediately initiate a handover to the WiFi network even if doing so immediately would not efficiently use the GSM network.

6.3. Handover Examples

Examples of handover logic according to an embodiment will now be described with respect to FIGS. 4A-4C. In an embodiment, a mobile handset user subscribes to a WiFi service provider operating a WiFi network. Because the mobile handset user is not currently within range of a WiFi network, the mobile handset 400 is connected, for example, to a GSM network 401 operated by another service provider with which the mobile handset user's service provider has a roaming agreement. The service provider operating the GSM network monitors the duration of time 406 that the mobile handset user connects to the GSM network. In an embodiment, a software client on the mobile handset may also monitor the duration of time 406 that the mobile handset user connects to the GSM network.

Once the mobile handset user moves into range of WiFi, the software client on the mobile handset may detect 412 the WiFi connection and determines whether its signal strength and/or network connection quality is above a predetermined threshold. If the signal is strong enough, the software client may initiate a handover if the GSM signal is weak. Otherwise, the software client may then determine whether an efficient use of the GSM network has been made before initiating a handover to the WiFi network. This determination may include evaluating the time that the mobile handset has been connected 406 to the GSM network with respect to a time boundary 402 and time threshold 404 set by the software client. Time threshold 404 establishes a three second time window before time boundary 402. For example, in FIGS. 4A-4C, the GSM network charges by the minute, so the software client may set the time boundary to one minute, or 60 seconds 402. For the purposes of FIGS. 4A-4C, the time threshold 404 has been set by the software client to be 3 seconds before the time boundary 402. Since the time boundary occurs each 60 seconds, the time threshold occurs on the 57th second of each minute in FIGS. 4A-4C, setting a three second time window to initiate a handover. The software client may therefore wait until the mobile handset has been connected to the GSM network three seconds prior to a new minute boundary before initiating a handover to the WiFi network.

FIG. 4A illustrates one example of handover logic according to an embodiment. In FIG. 4A, the duration of time that a mobile handset is connected to a GSM network is illustrated, and time boundaries (e.g., 408), occurring every minute in this example, are labeled. Time thresholds are shown as dots (e.g., 410) before the time boundaries and are not necessarily drawn to scale. In FIG. 4A, if the mobile handset has been connected to the GSM network a total of two minutes and thirty seconds, and a WiFi network becomes available 412, the software client may determine that the mobile handset should wait until the mobile handset has been connected to the GSM network a total of two minutes and fifty seven seconds (until it reaches the next time boundary 414) before initiating a connection to the WiFi network. In other words, the software client may evaluate $(((TB-T)-NT)<=0)$ to determine whether a handover should be initiated, where TB is the time boundary, T is the threshold, and NT is a network timer monitoring the duration of time 406 the mobile handset has connected to the GSM network.

In an embodiment, the network timer may be reset each time a time boundary has been reached. However, it should be understood that resetting the network timer is optional. For example, in FIG. 4A, NT may be 30 (as the mobile handset has been connected to the GSM network 30 seconds after the previous time boundary 411), TB may be 60, and T may be 3. The software client may evaluate $(((60-3)-30)<=0)$, which evaluates as $(57-30<=0)$, which is false. The software client may therefore wait and keep evaluating the expression until the expression evaluates as true, which will occur at the next time threshold 414. At the next time threshold 414, the mobile handset will have been connected to the GSM network for 57 seconds, so the expression will evaluate as $(((60-3)-57)<=0)$, which is true.

FIG. 4B illustrates another example of handover logic according to an embodiment. In FIG. 4B, the mobile handset detects 418 an available WiFi network when it has been connected a total of two minutes and 58 seconds to a GSM network. In this example, the detection 418 of the network occurs after a time threshold 416 but before the next 3 minute time boundary. The software client may evaluate $(((60-3)-58)<=0)$, which is true, since $(57-58<=0)$ is true, and the software client may therefore initiate a handover to WiFi.

FIG. 4C illustrates another example of handover logic according to an embodiment. In FIG. 4C, the mobile handset has been connected a total of three minutes and 10 seconds before a WiFi network is detected 420. The software client may evaluate $(((60-3)-10)<=0)$, which is false, since $(57-10<=0)$ is false. The software client may then wait and keep evaluating the expression until the expression evaluates as true, which will occur at the next time threshold 422, since the expression will then evaluate as $(((60-3)-57)<=0)$, which is true.

Similar calculations may be made if the network timer (NT) is not reset each time a time boundary has been reached. For example, in FIG. 4A, after an available WiFi network is detected 412, the software client may instead calculate $(((180-3)-150)<=0)$, which is false. In this case, 180 is used as the time boundary value because the next time boundary occurs at 180 seconds, and 150 is used as the network timer, since the mobile handset has been connected a total of 2 minutes and 30 seconds, or 150 seconds. The software client may wait and keep evaluating the expression until it evaluates as true, which will occur at the next time threshold 414. At the time threshold 414, the software client will evaluate $(((180-3)-177)<=0)$, which is true.

6.4. Second Time Threshold

In an embodiment, a second window (or second time threshold) may be used to set a time after which a handover is not initiated. In some cases, a service provider may use a second time window (or second time threshold) to prevent initiation of handover due to a risk of failing to complete a transition before a new billing increment is started. For example, if a GSM provider charges by the minute, a second time threshold may be set at one second before each minute. In this example, even if an available WiFi network is detected at or after the second time threshold, a handover to WiFi will not be initiated because the handover may not successfully complete before the new billing increment starts.

A second algorithm may be used as a further check to insure that a handover to an available network is not initiated if the available network is detected at a time before the next time boundary but on or after the second time threshold. For example, a software client on the communications device may evaluate $(((TB-T_2)-NT)>0)$ to determine whether a handover should be initiated, where TB is the time boundary, $T_2$ is the second time threshold, and NT is a network timer monitoring the duration of time the mobile handset has connected to the GSM network.

Figure 5:
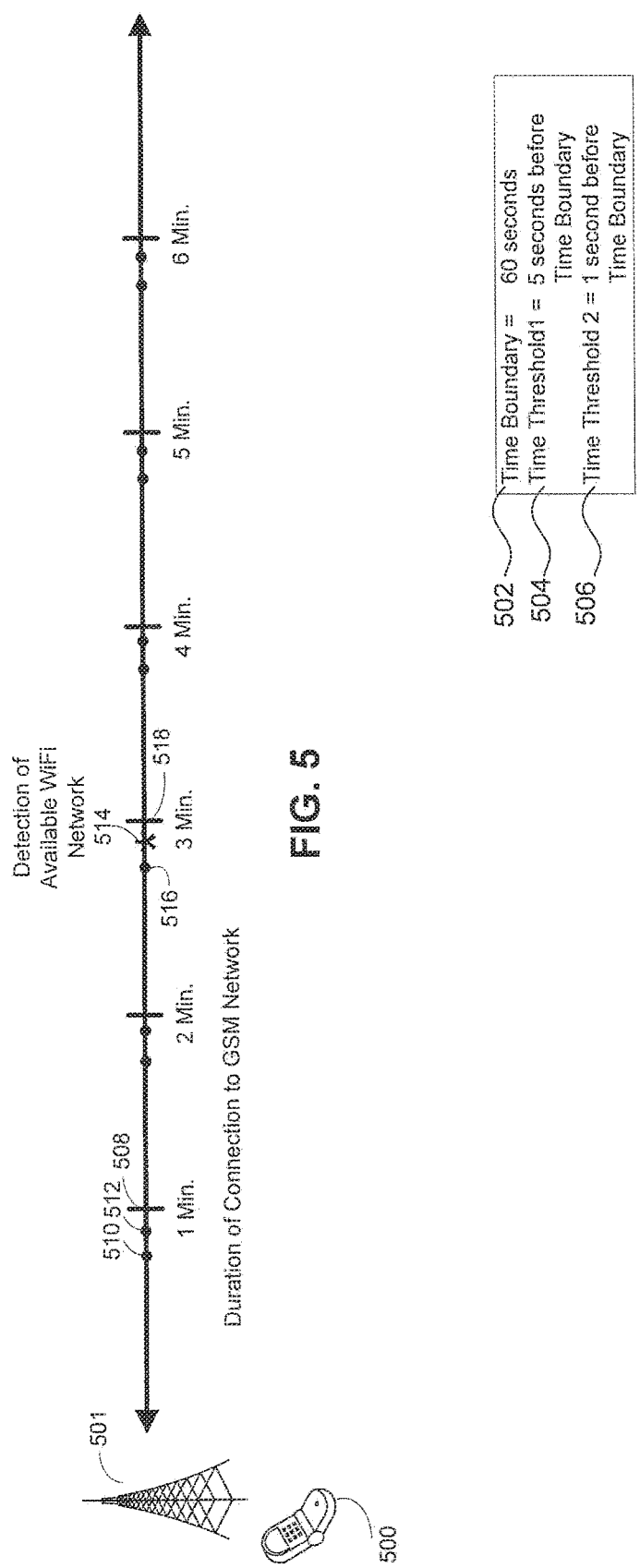
FIG. 5 illustrates an example of handover logic according to an embodiment utilizing two time thresholds.

FIG. 5 shows an example of an embodiment utilizing two time thresholds. In FIG. 5, a mobile handset 500 is connected to a GSM network 501. In this example, the service provider has set the time boundary 502 to each minute, or 60 seconds. A first time threshold 504 is set to 5 seconds before each time boundary 508, and a second time threshold 506 is set to 1 second before each time boundary 508, establishing a second time window of one second duration. The first 510 and second 512 time thresholds are shown in FIG. 5 as dots before each time boundary 508. It should be noted that FIG. 5 is not drawn to scale for clarity.

In FIG. 5, the mobile handset detects 514 an available WiFi network when it has been connected a total of two minutes and 59 seconds to a GSM network. In this example, the detection 514 of the network occurs after the first time threshold 516 and before the next 3 minute time boundary. Therefore, the software client may evaluate $(((60-5)-59)<=0)$, which is true, since $(55-59<=0)$ is true.

However, the detection 514 of the network occurs at the second time threshold 514. Therefore, the software client may evaluate the expression $(((60-1)-59)>0)$, which evaluates as false, because $(59-59>0)$ is false. Thus, no handover is initiated.

7. CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for performing a handover of a communications device from a first network to a second network, the method comprising:
   detecting, by the communications device within a coverage area of the first network, the second network; and
   initiating and completing the handover of the communications device from the first network to the second network within a time window before a time boundary and without crossing the time boundary in response to detecting the second network, the time boundary being based on a unit of time used by a service provider of the first network to charge for access of the communications device to the first network.

2. The method of claim 1, wherein the initiating and completing comprises:
   initiating and completing the handover of the communications device upon reaching the time window or the time boundary.

3. The method of claim 1, wherein the initiating and completing comprises:
   disconnecting the communications device from the first network within the time window and without crossing the time boundary; and
   connecting the communications device to the second network within the time window and without crossing the time boundary.

4. The method of claim 1, wherein the time boundary corresponds to a quanta of time that is used by a network operator for purposes of charging a network user connected to the first network, and
   wherein the time window corresponds to a period of time before the time boundary.

5. The method of claim 4, wherein the period of time corresponds to at least one of:
   a first amount of time needed to establish a connection to the second network, and
   a second amount of time needed to disconnect a connection to the first network.

6. The method of claim 1, further comprising:
   determining whether enough time remains in a billing increment of the first network to perform the handover of the communications device from the first network to the second network within the time window before the time boundary and without crossing the time boundary; and
   preventing initiation of the handover of the communications device from the first network to the second network when enough time does not remain in the billing increment of the first network to perform the handover of the communications device from the first network to the second network,
   wherein the initiating and completing comprises:
      initiating and completing the handover of the communications device from the first network to the second network when enough time remains in the billing increment of the first network to perform the handover of the communications device from the first network to the second network.

7. The method of claim 1, further comprising:
   initiating and completing the handover of the communications device from the first network to the second network in a second billing increment of the first network within the time window before the time boundary and without crossing the time boundary.

8. A communications device, comprising:
   a memory that stores instructions; and
   a processor configured to execute the instructions, the instructions, when executed by the processor, configuring the processor to:
      detect a first network while within a coverage area of a second network; and
      initiate and complete a handover of the communications device from the second network to the first network within a time window before a time boundary and without crossing the time boundary in response to detecting the first network, the time boundary being based on a unit of time used by a service provider of the second network to charge for access of the communications device to the second network.

9. The communications device of claim 8, wherein the instructions, when executed by the processor, configure the processor to initiate and complete the handover of the communications device upon reaching the time window or the time boundary.

10. The communications device of claim 8, wherein the instructions, when executed by the processor, configure the processor to disconnect the communications device from the second network within the time window and without crossing the time boundary and to connect the communications device to the first network within the time window and without crossing the time boundary.

11. The communications device of claim 8, wherein the time boundary corresponds to a quanta of time that is used by a network operator for purposes of charging a network user connected to the second network, and
wherein the time window corresponds to a period of time before the time boundary.

12. The communications device of claim 11, wherein the period of time corresponds to at least one of:
a first amount of time needed to establish a connection to the first network, and
a second amount of time needed to disconnect a connection to the second network.

13. The communications device of claim 8, wherein the instructions, when executed by the processor, further configure the processor to
determine whether enough time remains in a billing increment of the second network to perform the handover of the communications device from the second network to the first network within the time window before the time boundary and without crossing the time boundary; and
prevent initiation of the handover of the communications device from the second network to the first network when enough time does not remain in the billing increment of the second network to perform the handover of the communications device from the second network to the first network,
wherein the instructions, when executed by the processor, configure the processor to initiate and complete the handover of the communications device from the second network to the first network when enough time remains in the billing increment of the second network to perform the handover of the communications device from the second network to the first network.

14. A service provider device for performing a handover of a communications device from a first network to a second network, the service provider device comprising:
a memory that stores instructions; and
a processor configured to execute the instructions, the instructions, when executed by the processor, configuring the processor to:
receive a handover request from the communications device to perform the handover of the communications device from the first network to the second network; and
initiate and complete the handover of the communications device from the first network to the second network within a time window before a time boundary and without crossing the time boundary in response to detecting the second network, the time boundary being based on a unit of time used by a service provider of the first network to charge for access of the communications device to the first network.

15. The service provider device of claim 14, wherein the instructions, when executed by the processor, configure the processor to initiate and complete the handover of the communications device upon reaching the time window or the time boundary.

16. The service provider device of claim 14, wherein the instructions, when executed by the processor, configure the processor to disconnect the communications device from the second network within the time window and without crossing the time boundary and to connect the communications device to the first network within the time window and without crossing the time boundary.

17. The service provider device of claim 14, wherein the time boundary corresponds to a quanta of time that is used by a network operator for purposes of charging a network user connected to the second network, and
wherein the time window corresponds to a period of time before the time boundary.

18. The service provider device of claim 17, wherein the period of time corresponds to at least one of:
a first amount of time needed to establish a connection to the first network, and
a second amount of time needed to disconnect a connection to the second network.

19. The service provider device of claim 14, wherein the instructions, when executed by the processor, further configure the processor to:
determine whether enough time remains in a billing increment of the second network to perform the handover of the communications device from the second network to the first network within the time window before the time boundary and without crossing the time boundary; and
prevent initiation of the handover of the communications device from the second network to the first network when enough time does not remain in the billing increment of the second network to perform the handover of the communications device from the second network to the first network,
wherein the instructions, when executed by the processor, configure the processor to initiate and complete the handover of the communications device from the second network to the first network when enough time remains in the billing increment of the second network to perform the handover of the communications device from the second network to the first network.

20. The service provider device of claim 14, wherein the first network comprises a cellular network, and
wherein the second network comprises a WiFi network.

* * * * *